Feb. 10, 1931.  F. P. HINCKLEY  1,791,672
AIR COMPRESSOR
Filed March 11, 1929    2 Sheets-Sheet 1
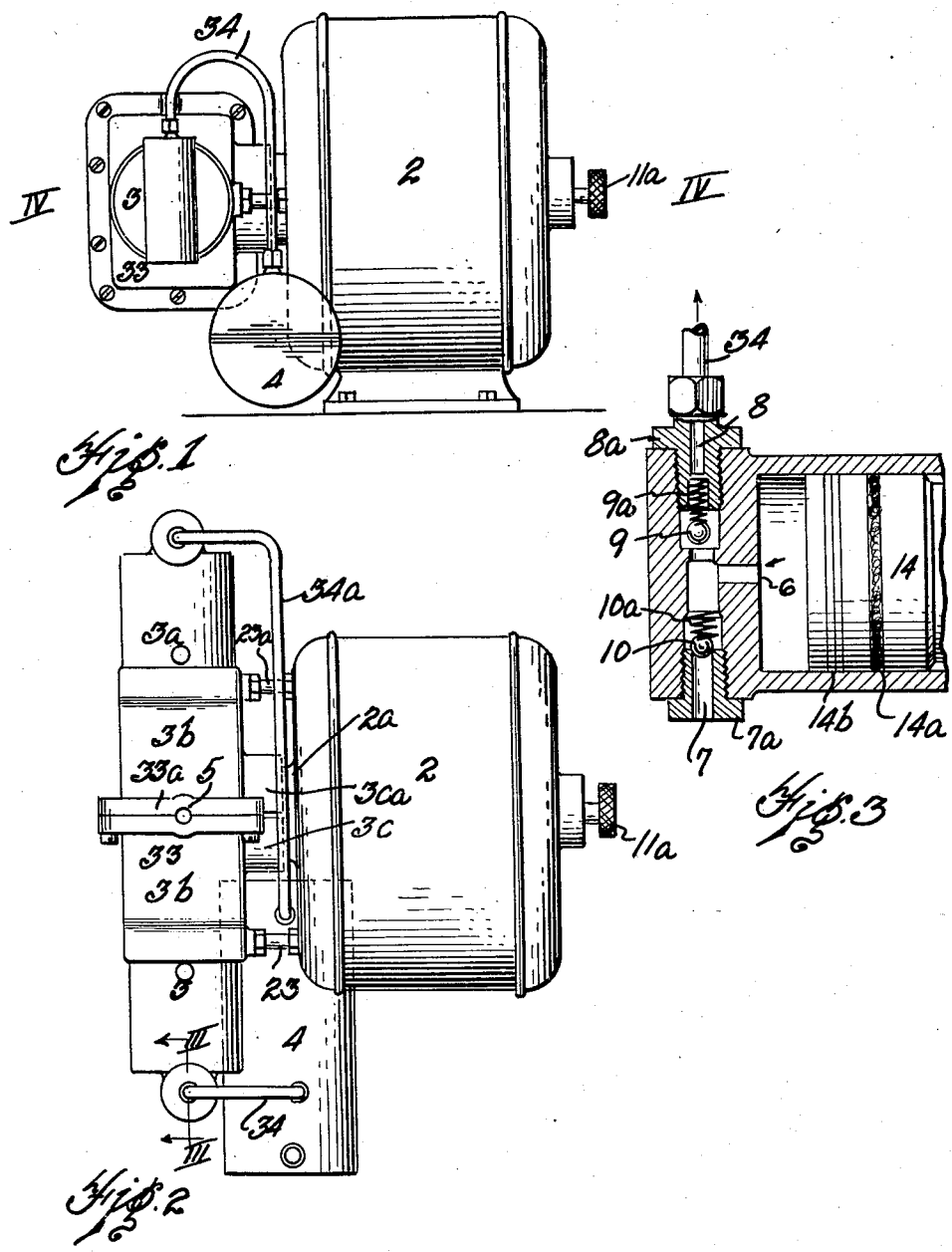
INVENTOR.
FREDERICK P. HINCKLEY
BY
ATTORNEY.

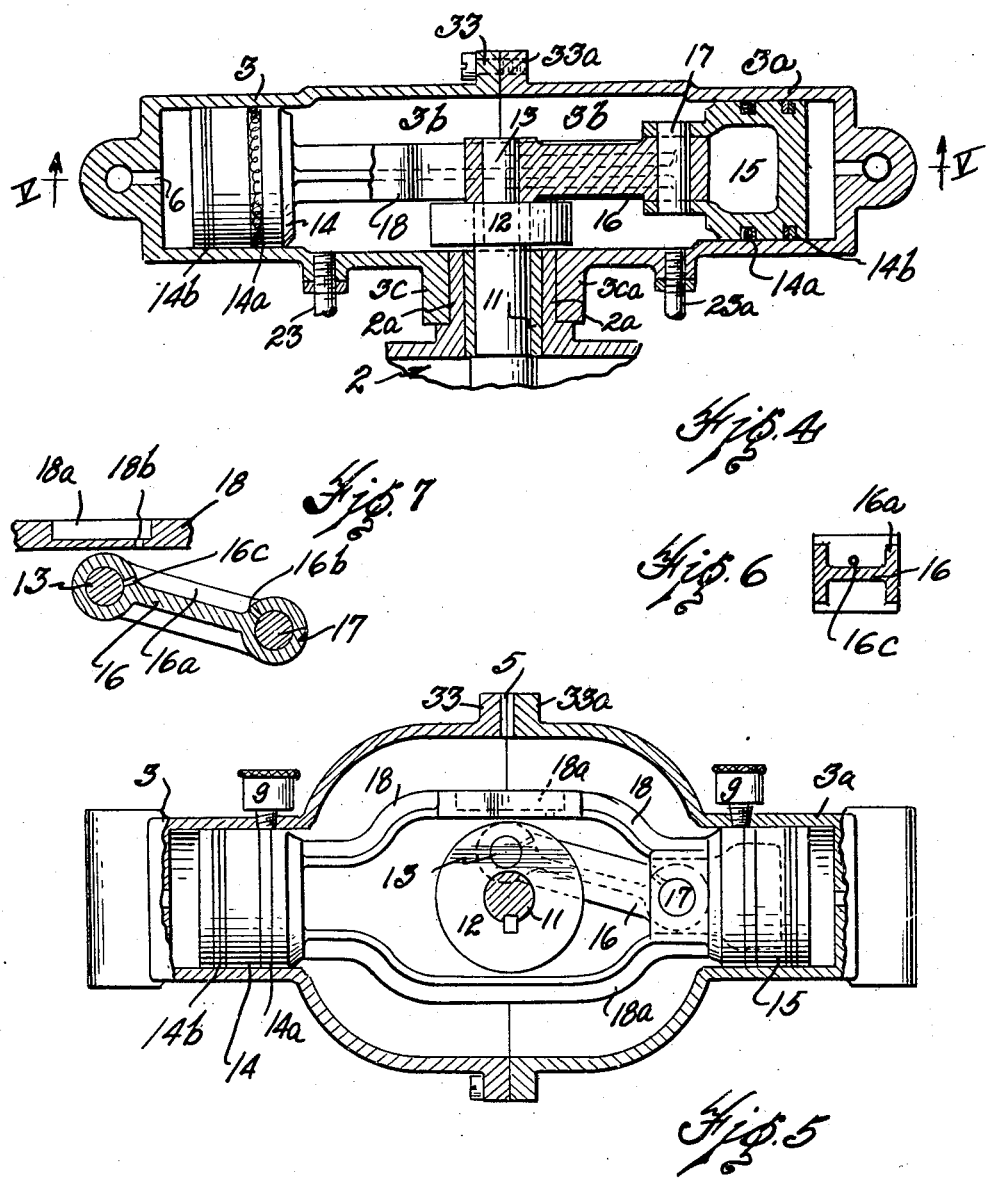

Patented Feb. 10, 1931

1,791,672

UNITED STATES PATENT OFFICE

FREDERICK P. HINCKLEY, OF JACKSON, MICHIGAN

AIR COMPRESSOR

Application filed March 11, 1929. Serial No. 345,911.

My invention relates to an apparatus for compressing air and an object of my improvement is to provide a compressor to handle small quantities of air that is simple in construction, effective in operaton and that can be readily adjusted to and coupled with a motor.

I secure this object in the apparatus illustrated in the accompanying drawings, in which:

Figure 1 is an elevation of an apparatus embodying my invention.

Figure 2 is a plan view of the same.

Figure 3 is a section on an enlarged scale in the plane III, III, Figure 2.

Figure 4 is a horizontal section approximately on the line IV, IV, Figure 1.

Figure 5 is a vertical section approximately on the line V, V, Figure 4.

Figure 6 is a detail cross-section of the connecting rod, and

Figure 7 is a longitudinal section of the connecting rod and an adjacent part of the piston yoke.

2 is the casing of an electric motor having a cylindrical outwardly projecting bearing 2a for the motor shaft 11.

3 is a cylinder closed at one end and opening at the other into an extension that shall form half of the crank case. 3a is a second cylinder, entirely similar to 3 and having an entirely similar extension that is joined with the extension of the cylinder 3 to complete the crank case of an opposed-cylinder pump 33 and 33a are flanges respectively around the open end of the extension from the cylinder 3 and the extension from the cylinder 3a, which are bolted together to secure the cylinder in place. 3c and 3ca are half collars connected respectively with the cylinders 3 and 3a. Said half collars embrace the cylindrical extension 2a and are clamped thereon when the flanges 33 and 33a are bolted together to secure the cylinders in place.

23 and 23a are bolts which may be used to help secure the cylinders to the motor casing. 11 is the motor shaft resting in the bearing 2a and 12 is a disk keyed upon the shaft 11 within the crank-case 3b. 13 is a crank pin extending from the disk 12. 11a is an extension from the outer end of the shaft 11 which may be manipulated to start the motor.

14 and 15 are pistons rigidly connected together by a yoke having an upper and lower bar 18 and 18a. Said pistons fit and are adapted to slide respectively in the cylinders 3 and 3a.

Each of said pistons has a groove 14a filled with an oil absorbing substance, such as felt, and a groove 14b having piston rings therein. g, g, are oil cups adapted to supply oil to the upper portions of the pistons 14 and 15, which oil is distributed by the material in the groove 14a.

16 is a piston rod pivoted at one end on the pin 17 in the piston 15 and at the other end to the crank pin 13. The connecting rod 16 is so shaped in cross section as to form a trough 16a in its upper surface between its ends. Holes 16b and 16c are formed connecting the ends of the trough 16a respectively with the pins 13 and 17.

In the upper surface of the upper bar 18 of the yoke there is formed a receptacle 18a through the bottom of which there is a passage 18b (Fig. 7).

5 is an oil hole in the upper wall of the crank case 3b, above the receptacle 18a.

Oil is supplied to the receptacle 18a through the hole 5 and runs through the passage 18b upon the connecting rod 16 and into the trough 16a from whence it is supplied through the holes 16b and 16c to the pins 13 and 17 and the bearings for said pins in the end of the rod 16.

7 is a passageway extending vertically from the bottom of each of the cylinders at the outer end thereof and 8 is a vertical passage extending from the top and connecting with the passage 8. 7a and 8a are brass plugs with openings therethrough screwed into the outer ends of the passages 7 and 8. 6 is a horizontal passage extending inwardly from the bore of the cylinder and connecting with the inner ends of the passages 7 and 8. 10 is an inwardly opening valve in the passage 7, normally held closed by a spring 10a and 9 is an outwardly opening valve located in the passage 8 and normally held closed by a spring 9a.

4 is a receptacle for compressed air and 34 and 34a are conduit pipes connecting with the discharge passages 9 and with the tank 4.

The method of adjustment and the operation of the above described device is as follows:

The pistons 14 and 15 are placed in the open ends of the cylinders 3 and 3a and the flanges 33, 33a are brought together with the half collars 3c and 4ca embracing the bearing 2a and said flanges are bolted together clamping the cylinders upon the bearing 2a. The bolts 23 and 23a may also be used.

In assembling as above described the pin 13 has been engaged in its aperture in the free end of the connecting rod 16.

Oil is now placed in the cups g, g, and in the receptacle 18a, and the motor is started, either by the current itself or by turning the shaft by hand by means of the extension 11a, or both.

The turning of the shaft 11 reciprocates the pistons 3, 3a, through the connecting rod 16 which act in the usual way to compress air into the tank 4. The cups g, g, supply oil to the interior of the cylinders and the material in the grooves 14a acts to wipe the oil over the surface and distribute it thereon.

Oil is supplied to the receptacle 18a through the hole 5 and falls upon the connecting rod 16 and into the trough 16a, from whence it is supplied to the pins 13 and 17 through the passages 16b and 16c.

What I claim is:

1. The combination of a motor having a shaft bearing thereon, an opposed cylinder pump, each cylinder having a portion of a common crank case thereon and means for securing the portions of the crank case together and thereby clamping said bearing to secure the pump in place, a shaft in said bearing having a crank at its end, rigidly connected pistons in said cylinders, a connecting rod pivoted at one end to one of said pistons and at the other end to said crank.

2. The combination of a motor having a shaft bearing thereon, an opposed cylinder pump, each cylinder having a portion of a common crank case thereon and means for securing the portions of the crank case together and thereby clamping said bearing to secure the pump in place, a shaft in said bearing having a crank at its end, rigidly connected pistons in said cylinders, said crank engaging said pistons in the crank case, an oil receptacle in the rigid connection of said pistons, said receptacle being adapted to supply oil to the crank connection.

3. The combination of a motor having a shaft bearing thereon, an opposed cylinder pump, each cylinder having a portion of a common crank case thereon and means for securing the portions of the crank case together and thereby clamping said bearing to secure the pump in place, a shaft in said bearing having a crank at its end, rigidly connected pistons in said cylinders, a connecting rod pivoted at one end to one of said pistons and at the other end to said crank, said connecting rod being provided with a receptacle along its upper edge connecting at its ends with the bearings in said rod and means for supplying oil to said receptacle.

4. The combination of a motor having a shaft bearing thereon, an opposed cylinder pump, each cylinder having a portion of a common crank case thereon and means for securing the portions of the crank case together and thereby clamping said bearing to secure the pump in place, a shaft in said bearing having a crank at its end, rigidly connected pistons in said cylinders, a connecting rod pivoted at one end to one of said pistons and at the other end to said crank, said connecting rod being provided with a receptacle along its upper edge connecting at its ends with the bearings in said rod, an oil receptacle in the rigid connection of said pistons, said oil receptacle being adapted to supply oil to the receptacle along the upper edge of the connecting rod.

In testimony whereof, I sign this specification.

FREDERICK P. HINCKLEY.